United States Patent [19]

Skretting

[11] 4,303,508
[45] Dec. 1, 1981

[54] SCREENING DEVICE

[75] Inventor: Arne Skretting, Karlstad, Sweden

[73] Assignee: Kamyr Aktiebolag, Karlstad, Sweden

[21] Appl. No.: 136,749

[22] Filed: Apr. 2, 1980

[30] Foreign Application Priority Data

Apr. 5, 1979 [SE] Sweden ............................. 7903032

[51] Int. Cl.³ .......................... B07B 1/24; B07B 1/52
[52] U.S. Cl. ................................. 209/297; 209/385
[58] Field of Search ............. 209/270, 288, 289, 303, 209/304, 379, 385, 297; 210/396, 402

[56] References Cited

U.S. PATENT DOCUMENTS

| 1,185,794 | 6/1916 | Haug ................................... 209/270 |
| 1,469,490 | 10/1923 | Waterman ............................ 210/396 |
| 3,404,065 | 10/1968 | Ingemarsson ....................... 162/233 |
| 3,533,505 | 10/1970 | Nelson ............................ 209/379 X |
| 3,755,072 | 8/1973 | Ostberg et al. ..................... 162/251 |
| 3,933,649 | 1/1976 | Ahlfors ........................... 209/304 X |
| 3,939,065 | 2/1976 | Ahlfors ........................... 209/304 X |

FOREIGN PATENT DOCUMENTS 871266 5/1971 Canada .
949460 6/1974 Canada .
409735 9/1979 Sweden .
218036 7/1924 United Kingdom .

Primary Examiner—William A. Cuchlinski, Jr.
Attorney, Agent, or Firm—Cushman, Darby & Cushman

[57] ABSTRACT

A screening assembly is provided including a closed housing having an inlet and a first outlet, and a second outlet. A screen drum having a plurality of circumferential slots is mounted for rotation in the housing so that liquid passing from the inlet to the second outlet must pass through the drum slots. A a barrier member mounted on a short housing segment between the inlet and first outlet prevents short-circuiting of suspension flow from the inlet to the first outlet, and also includes a plurality of comb-like teeth extending into the drum circumferential slots. The barrier member has concave surface portions thereof adjacent the suspension inlet and outlet. The drum has a plurality of circumferentially spaced grooves or raised portions formed in or on the exterior surface thereon and extending substantially parallel to the axis of the rotation of the drum. The center lines of the inlet and first outlet preferably make an angle of about 45°–90° with respect to each other, and the second outlet is perpendicular to a plane containing the inlet and first outlet.

11 Claims, 5 Drawing Figures

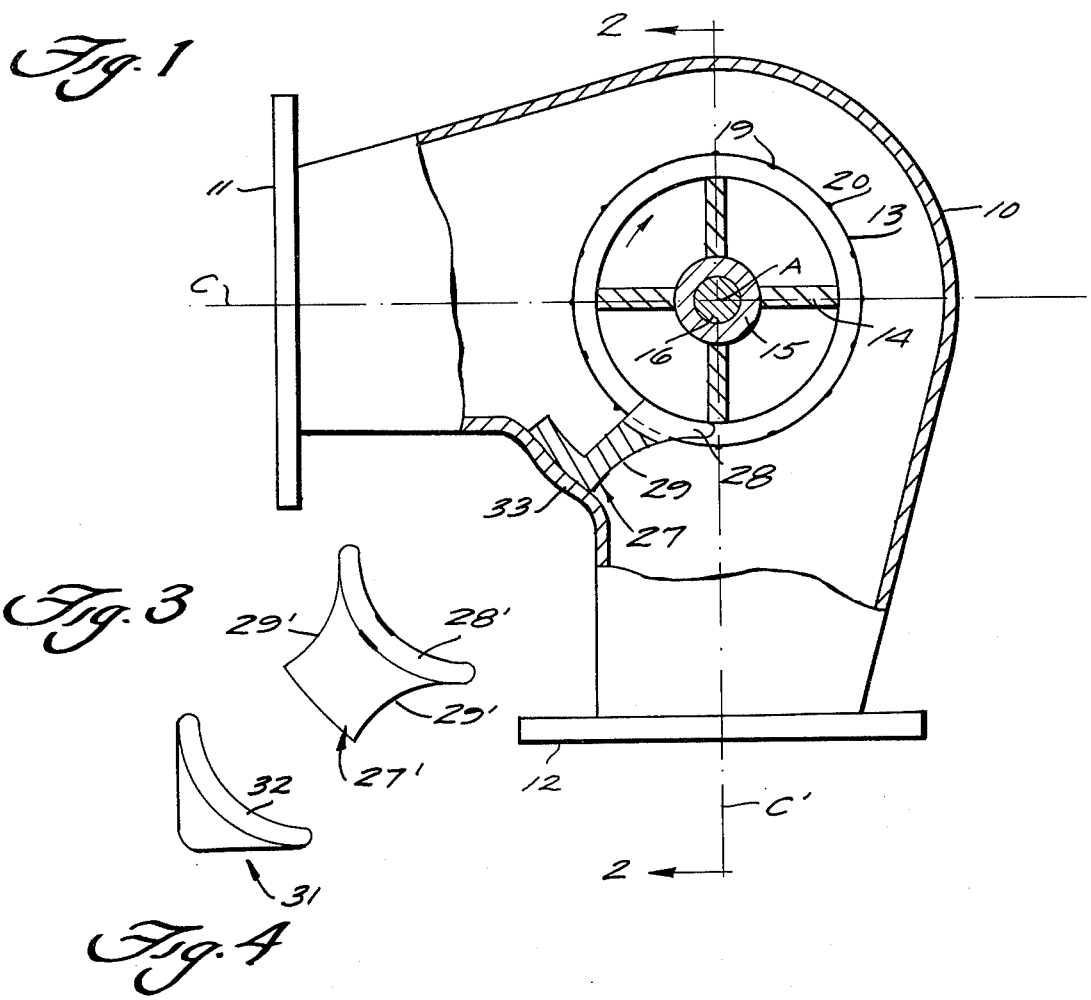
Fig. 1
Fig. 3
Fig. 4
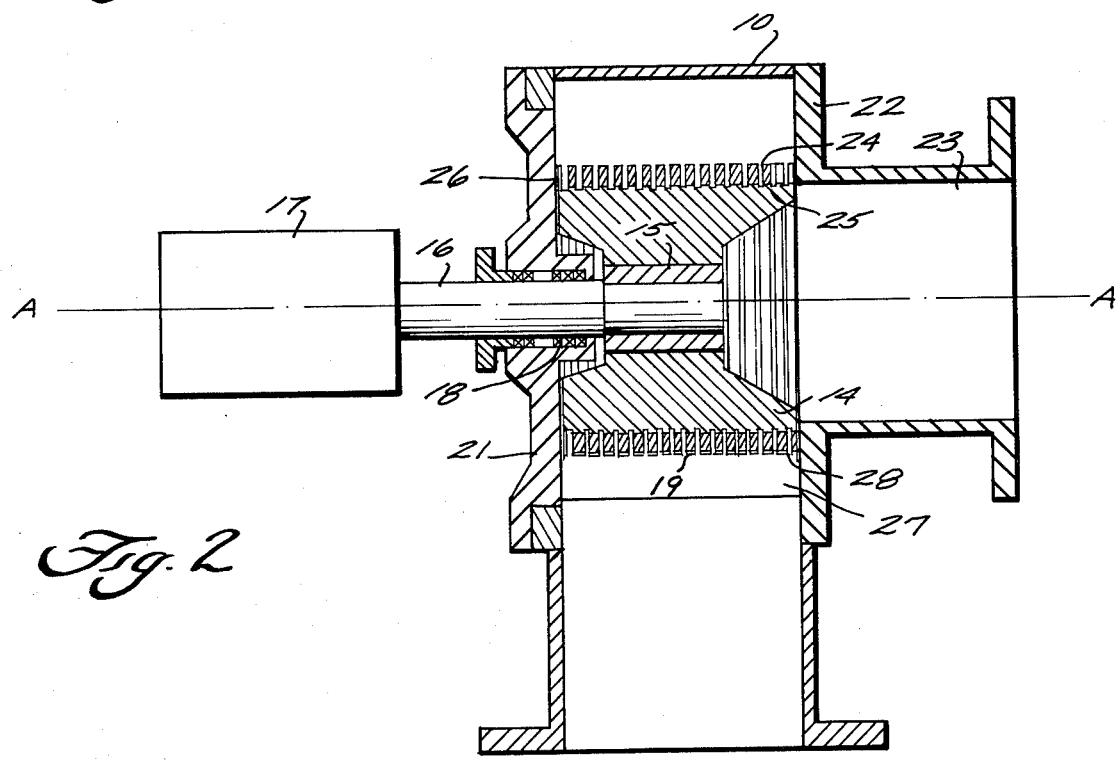
Fig. 2

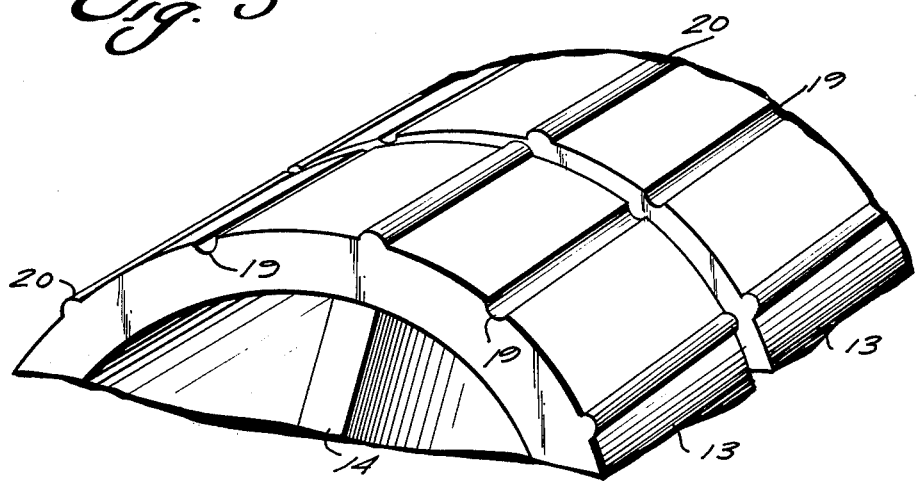

SCREENING DEVICE

BACKGROUND AND SUMMARY OF THE INVENTION

The present invention relates to a screening assembly that is designed to be simple and versatile being relatively inexpensive to construct and maintain, and having a minimum number of component parts to perform the necessary operations. Prior art screening assemblies have been effective in performing their ultimate function, however they often are too bulky for many types of uses and environments and can be unnecessarily complicated.

The simplicity and versatility of the present invention are readily apparent when the small number of component parts thereof are considered, and when it is considered the assembly according to the invention may be used in many situations and environments. The screening assembly according to the present invention is capable of separating out knots, fiber bundles, shives and scrap material from suspensions of cellulosic fiber material having consistencies on the order of 8 to 10%, and can accomplish this without any air introduction so that no foam is developed, and can accomplish this without interruptions due to clogging of the screening element.

According to the present invention a screening assembly is provided comprising a closed housing having an inlet, a first outlet, and a second outlet. While the terms "inlet" and "outlet" are used in the present specification and claims for convenience, it should not be assumed that the recited elements can be used only as inlets or outlets, or always function as such. The screening assembly according to the invention further comprises a screen drum mounted for rotation about an axis and having a plurality of circumferential through-extending slots formed along the exterior periphery thereof, and disposed in planes substantially perpendicular to the axis of rotation.

Means are provided for rotating the drum about its axis of rotation, and means are provided for mounting the drum for rotation about its axis within the housing so that suspension passing from the inlet to the second outlet must pass through the drum slots, the second outlet being essentially coaxial with the drum, and so that suspension flows pass the drum from the inlet to the first outlet. Means are also provided for preventing short-circuiting of suspension flow from the inlet to the first outlet, and for dislodging suspension particles caught within the drum slots. Such short-circuiting preventing and particle dislodging means may comprise a single component, such as a barrier member mounted on a short housing segment between the inlet and first outlet, and having a plurality of comb-like teeth extending into the drum circumferential slot. The barrier member preferably has concave surfaces formed on portions thereof adjacent the inlet and first outlet to facilitate directing the suspension.

The inlet and the first outlet preferably lie in a common plane, each having a center line, and the housing preferably connects the inlet and the first outlet so that the center lines thereof make an angle of about 45°–90° with respect to each other. The second outlet preferably is disposed perpendicular to the common plane containing the inlet and the first outlet.

The drum preferably has a plurality of axially extending surface manifestations formed thereon to facilitate transportation of the suspension being screened by the drum. Such surface manifestations may comprise of a plurality of circumferentially spaced grooves, or a plurality of circumferentially spaced raised portions.

In addition to the barrier member, accessory cleaning devices may be provided spaced from the barrier member around the circumference of the drum, and having a plurality of comb-like teeth extending into the drum slots to effect dislodgement of suspension particles therefrom. Such a cleaning device or devices are mounted and dimensioned to allow passage of suspension therepast from the inlet to the first outlet.

It is the primary object of the present invention to provide a simple, versatile, and effective screening assembly. This and other objects of the invention will become clear from an inspection of the detailed description of the invention, and from the appended claims.

BRIEF DESCRIPTION OF THE DRAWINGS

FIG. 1 is a top view, partly in cross-section and partly in elevation, of an exemplary screening assembly according to the present invention;

FIG. 2 is a cross-sectional view taken along lines 2—2 of FIG. 1;

FIG. 3 is a top plan view of a modified form of barrier member that may be utilized in screening assembly of FIG. 1;

FIG. 4 is a top plan view of an accessory cleaning device that may be utilized in the screening assembly of FIG. 1.

FIG. 5 is a detailed perspective view illustrating surface manifestations that may be provided on the screen drum of the assembly according to the invention.

DETAILED DESCRIPTION OF THE DRAWINGS

In the exemplary embodiment illustrated in the drawings, the following reference numerals refer to the following components:

| | |
|---|---|
| 10 - housing | 11 - inlet |
| 12 - first outlet | 13 - screen drum |
| 14 - drum spokes | 15 - boss |
| 16 - drum shaft | 17 - motor |
| 18 - seal | 19 - axially extending grooves |
| 20 - axially extending raised portions | 21 - housing end wall |
| 22 - housing end wall | 23 - second outlet |
| 24 - screen drum outer wall | 25 - circumferentially extending drum slots |
| 26 - gap between drum and end wall | 27 - barrier member |
| 27'- barrier member | 28, 28' - barrier teeth |
| 29, 29' -barrier member surface portions | 31 - cleaning device |
| 32 - cleaning device teeth | 33 - short housing segment |

As illustrated in the drawing, the inlet 11 and the first outlet 12 of the housing 10 are preferably disposed in a common plane, and have center lines C, C' that make an angle of about 45°–90° with respect to each other. The second outlet 23 is coaxial with the drum 13, and it (and axis A—A about which drum 13 rotates) is substantially perpendicular to the common plane containing the inlet 11 and first outlet 12. While the structure 11 is denoted the inlet and the structure 12 the outlet, in fact they may be reversed and suspension may be fed in through structure 12 (then making it the inlet) with rejected material passing through the structure 11.

The motor 17 and shaft 16 acting through boss 15 and spokes 14 rotate drum 13 about axis A—A, rotation being in the direction of the arrow in FIG. 1 when structure 11 is the inlet. The slots 25 are dimensioned to allow passage therethrough of suspension having particles less than a predetermined size, but will not allow passage of particles having a size greater than a predetermined desired value. The gap 26 provided between drum 13 and in wall 21 is preferably about 1 millimeter.

The shaft 16, spokes 14, etc. also mount the drum 13 for rotation within the housing 10 so that suspension passing from the inlet 11 to the second outlet 23 must pass through the drum slots, and so that suspension flows past the drum exterior surface 24 from the inlet 11 to the first outlet 12.

According to the present invention means are also provided for preventing short-circuiting of the suspension flow from the inlet to the first outlet and for dislodging suspension particles (those being separated out) caught within the drum slots 25. Preferably such means comprises a single simple structure such as barrier member 27. The barrier member 27 is mounted to the short housing segment 33 between inlet 11 and first outlet 12, and allows no flow directly from inlet 11 to first outlet 12—rather the suspension must flow around and past the majority of the circumference of the drum 13. The barrier member 27 includes a plurality of comb-like teeth 28 which extend into the slots 25 (see FIG. 2) to dislodge particles therefrom. The teeth 28 are somewhat narrower than the slots 25 so that no metal-to-metal contact exists. The member 27 has a concave surface portion 29 thereof formed on a portion thereof adjacent the first outlet 12 to direct any remaining suspension flow impacting thereon to the first outlet 12.

While the barrier member 27 illustrated in FIG. 1 is very simple, it does have one drawback in that it is not ideal when it is desired to reverse the suspension flow (i.e. use the first outlet 12 as the inlet). Under such circumstances it is necessary to detach the member 27 from the segment 33 and re-orient it the opposite manner. In order to avoid such steps should suspension flow desirably be reversed, the barrier member 27' may be utilized. Member 27' has teeth 28' having accurate portions at both ends thereof, and has surface portions 29' formed on portions thereof adjacent both the first outlet 12 and inlet 11.

If further cleaning activity is desired, a cleaning device such as device 31 illustrated in FIG. 4 may be employed. A cleaning device 31 has a plurality of comblike teeth 32 generally comparable to the teeth 28, which extend into the drum slots 25, and the cleaning device 31 (or plurality of such devices) may be mounted around the circumference of the drum 13 spaced from the barrier member 27 (or 27') and is dimensioned and mounted to allow passage of suspension therepast from the inlet 11 to the first outlet 12.

In order to improve the transporting action of the screen drum 13 it may be equipped with a plurality of axially extending surface manifestations circumferentially spaced around the outer periphery 24 thereof. Such surface manifestations may take the form of a plurality of grooves 19 (e.g. 16 grooves having a length of about 5 millimeters and depth of about 1 millimeter), or a plurality of raised portions 20. The drum 13 also may be constructed to counter clogging of the slots 25 by providing a slight inward widening thereof (e.g. about 3°).

It is desirable to keep the first outlet 12 open to minimize the possibilities of clogging up the screen drum 13, however under some circumstances the first outlet 12 may be closed off and the rejected particles allowed to collect within the housing 10 to be periodically removed.

The screening assembly according to the present invention may be used for screening a large variety of suspensions. However the assembly is eminently suited for the screening of cellolosic fiber suspensions (pulp), even pulp having a consistency of about 8 to 10%, and an exemplary operation thereof will be described with respect to such pulp screening function:

Suspension flows under pressure (e.g. the pressure from a continuous digester) through the inlet 11 while the motor 17 rotates drum 13 in the direction of the arrow in FIG. 1. The suspension flows into contact with the screening drum, a portion of it immediately passing through the slots 25 in drum 13, while other portions continue to pass through the housing 10 adjacent the drum 13, the drum 13 transporting some of the suspension in that direction. For pulp the slots 25 would be about 5 millimeters, and the drum 13 would be rotated at about 100–200 RPM. When utilized in that manner, all of the suspension passing through slots 25 is free of knots, shives, etc., while the remainder of the suspension passing through first outlet 12 contains the knots, shives, etc, therein.

The suspension flowing into housing 10 through inlet 11 cannot short circuit to the first outlet 12, the barrier member 27 preventing that. Any knots, shives, or scrap material, or other reject material disposed in slots 25 is dislodged therefrom by the teeth 28 as the lodged structure is rotated by the drum 13 into contact with a tooth 28.

When the first outlet 12 is connected up to a sluicing device, such as the type having pockets or cells, the reject material is periodically flushed out by rotating the sluicing device to bring a new pocket or cell into operative association with the first outlet 12.

While the invention has been here in shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent assemblies and devices.

What is claimed is:

1. A screening assembly comprising
a closed housing having an inlet, a first outlet, and a second outlet;
a screen drum mounted for rotation about an axis and having a plurality of circumferential throughextending slots formed along the exterior periphery thereof, and disposed in planes substantially perpendicular to said axis of rotation;
means for rotating said drum about its axis of rotation;
means for mounting said drum for rotation about said axis within said housing so that suspension passing from said inlet to said second outlet must pass through said drum slots, said second outlet being essentially coaxial with said drum, and so that suspension flows past said drum from said inlet to said first outlet; and means for preventing short-circuiting of suspension flow from said inlet to said first outlet and for dislodging suspension particles caught within said drum slots, said means comprising a barrier member mounted in said housing between said inlet and first outlet and having a plurality of comb-like teeth extending into said drum circumferential slots.

2. A screening assembly as recited in claim 1 wherein said barrier member has a concave surface on a portion thereof adjacent said first outlet to facilitate directing the flow toward said first outlet.

3. A screening assembly as recited in claim 2 wherein said barrier member has a concave surface on a portion thereof adjacent said inlet.

4. A screening assembly as recited in claim 1 wherein said inlet and said first outlet lie in a common plane, and each has a center line; and wherein said housing connects said inlet and said first outlet so that said center lines of said inlet and first outlet make an angle of about 45°–90° with respect to each other, a short housing segment being provided therebetween.

5. A screening assembly as recited in claim 4 wherein said barrier structure is mounted to said short housing segment.

6. A screening assembly as recited in claim 5 wherein said barrier structure has concave surfaces formed on portions thereof adjacent said inlet and said first outlet respectively, said surfaces redirecting suspension flow impacting thereon.

7. A screening assembly as recited in claim 4 wherein said second outlet is substantially perpendicular to said common plane containing said inlet and said first outlet.

8. A screening assembly as recited in claim 1 wherein said drum further comprises a plurality of circumferentially spaced grooves formed in the exterior surface thereof extending substantially parallel to said axis of rotation.

9. A screening assembly as recited in claim 1 wherein said drum further comprises a plurality of circumferentially spaced raised portions formed on the exterior surface thereof extending substantially parallel to said axis of rotation.

10. A screening assembly as recited in claim 11 further comprising a cleaning device spaced from said barrier member around the circumference of said drum, and having a plurality of comb-like teeth extending into said drum slots to effect dislodgement of suspension particles therefrom, said cleaning device being mounted and dimensioned to allow passage of suspension therepast from said inlet to said first outlet.

11. A screening assembly comprising: a closed housing having an inlet, a first outlet, and a second outlet; a screen drum mounted for rotation about an axis and having a plurality of circumferential through-extending slots formed along the exterior periphery thereof, and disposed in planes substantially perpendicular to said axis of rotation; means defining a plurality of circumferentially spaced substantially continuous axially extending grooves on said drum exterior periphery for facilitating transportation of suspension within said housing by said screen drum; means for rotating said drum about its axis of rotation; means for mounting said drum for rotation about said axis within said housing so that liquid passing from inlet to said second outlet must pass through said drum slots and so that suspension flows past said drum from said inlet to said first outlet; and a cleaning device mounted within said housing and having a plurality of comb-like teeth extending into said drum slots to effect dislodgement of suspension particles therefrom.

* * * * *